United States Patent
Stent

(10) Patent No.: US 12,157,483 B2
(45) Date of Patent: Dec. 3, 2024

(54) SYSTEMS AND METHODS FOR DRIVER STATE CONDITIONED VISUAL SIGNALS

(71) Applicant: TOYOTA RESEARCH INSTITUTE, INC., Los Altos, CA (US)

(72) Inventor: Simon A. I. Stent, Cambridge, MA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/737,901

(22) Filed: May 5, 2022

(65) Prior Publication Data
US 2023/0356736 A1 Nov. 9, 2023

(51) Int. Cl.
*B60W 50/14* (2020.01)
*B60W 40/08* (2012.01)
*G06V 20/59* (2022.01)

(52) U.S. Cl.
CPC ........... *B60W 50/14* (2013.01); *B60W 40/08* (2013.01); *G06V 20/597* (2022.01); *B60W 2420/403* (2013.01); *B60W 2540/223* (2020.02); *B60W 2540/225* (2020.02)

(58) Field of Classification Search
CPC ........... B60W 50/14; B60W 40/08; B60W 2540/225; B60W 2540/223; B60W 2420/42; B60W 60/0015; B60W 60/0011; B60W 40/02; B60W 2540/229; B60W 2050/143; G06V 20/597; G06V 20/58; G06V 10/82; G06N 3/045

USPC ......................................................... 340/438
See application file for complete search history.

(56) References Cited

U.S. PATENT DOCUMENTS

| | | | |
|---|---|---|---|
| 11,718,314 B1* | 8/2023 | Nallani | B60Q 3/78 340/903 |
| 2016/0052524 A1* | 2/2016 | Kim | B60W 40/09 340/576 |
| 2017/0267251 A1 | 9/2017 | Roberts et al. | |
| 2018/0186379 A1* | 7/2018 | Brooks | B60W 60/0053 |
| 2019/0300031 A1* | 10/2019 | Gao | G01S 13/931 |
| 2020/0339131 A1* | 10/2020 | Olsson | B60W 50/0205 |
| 2021/0188291 A1 | 6/2021 | Kaliouby et al. | |
| 2021/0276568 A1* | 9/2021 | Verbeke | G06F 3/015 |

OTHER PUBLICATIONS

Rensink, Ronald, "Change Blindness," University of British Columbia, 2005 (https://www2.psych.ubc.ca/~rensink/publications/download/RR-MGY.pdf).
UCL News, "Blink and you miss it!," Jul. 25, 2005 (https://www.ucl.ac.uk/news/2005/jul/blink-and-you-miss-it).

* cited by examiner

*Primary Examiner* — Naomi J Small
(74) *Attorney, Agent, or Firm* — SEYFARTH SHAW LLP

(57) ABSTRACT

Systems and methods for use of operator state conditions to generate, adapt or otherwise produce visual signals relaying information to the operator are disclosed. A monitoring system may observe and analyze a vehicle operator to determine an operator state. The monitoring system may transmit the observed driver state to an operator alert system that generates, conditions and controls the transmission of signals to the operator.

18 Claims, 4 Drawing Sheets

SYSTEMS AND METHODS FOR DRIVER STATE CONDITIONED VISUAL SIGNALS

FIELD OF TECHNOLOGY

The present disclosure relates to systems and methods for alerting a vehicle operator, more specifically a system for using, conditioning and producing visual signals based on an observed driver state.

BACKGROUND

Visual signals are often used in vehicles to draw a driver's attention to important information. They are an attractive means of interacting with a driver because they can cheaply and quickly convey rich semantic information (e.g. via a symbol) and/or spatial information (e.g. by their positioning in the vehicle). Certain visual signals require immediate driver attention, and it may benefit the driver to become aware of them more quickly, even by a matter of 10s or 100s or milliseconds. Examples include blind spot warnings, engine warnings, and HUD-based hazard warnings. These signals are therefore designed to be very salient in order to convey their information as rapidly as possible. However, the effective saliency of a visual signal can vary from person to person (with small differences in human vision), and depends on the state of the person—such as where they are looking, what they are doing (e.g. are they cognitively loaded), and whether or not their eyes are open.

Autonomous and semi-autonomous vehicles rely on occupant monitoring systems and applications to supervise or otherwise track the activities and movements of a vehicle occupant. The ability to determine and track the position, pose, posture, attentiveness, and other characteristics of an occupant assist the safe and efficient operation of the vehicle. For example, driver monitoring systems (DMS) may be used to monitor a vehicle operator and reactively control the vehicle based on an observed behavior of the operator. The system may further monitor the occupant in the driver seat to ensure the driver is awake, alert and in a proper pose to take over operation of the vehicle should manual intervention be needed. Traditional driver monitoring systems feature one or more sensors and/or cameras that may identify and track the driver's eyes, head position, pose and the like. A processor or computing device may analyze the output of the sensors and output a control signal affecting the operation of the vehicle based on the date obtained from the sensors.

SUMMARY

Aspects of the present disclosure provide for systems and methods to use operator state conditions to generate, adapt or otherwise produce visual signals relaying information to the operator. According to one aspect, a monitoring system may observe and analyze a vehicle operator to determine an operator state. The monitoring system may transmit the observed driver state to an operator alert system that generates and controls the transmission of visual signals to the operator. According to one aspect, incorporating knowledge of driver state into the decision of when and how to activate the visual signals, it may be possible to produce less intrusive but more effective visual signals.

According to one aspect of the disclosure, a vehicle alert system is provided. The system may include a sensor module coupled to at least one sensor, a monitoring system including an image sensor and a processor. The processor may be configured to receive a first signal from the sensor module, receive a second signal from the monitoring system and condition the first signal based upon the second signal.

According to another aspect of the disclosure, a method of generating a vehicle alert is provided. The method may include receiving a first signal from a sensor module coupled to at least one sensor, receiving a second signal from a monitoring system comprising an image sensor, and conditioning the first signal based upon the second signal.

According to yet another aspect of the disclosure, a non-transitory computer-readable medium having program code recorded thereon for generating a vehicle alert is provided. The program code may be executed by a processor and comprise program code to receive a first signal from a sensor module coupled to at least one sensor, program code to receive a second signal from a monitoring system comprising an image sensor, and program code to condition the first signal based upon the second signal.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Aspects of the present disclosure provide a vehicle signal system that uses the knowledge of a driver's state to improve the behavior and effectiveness of visual signals transmitted and output by a vehicle. Visual signals, such as sometimes used to convey various vehicle states or ADAS warnings, are activated with no knowledge of the driver's state. By incorporating knowledge of driver state, accessible from a driver monitoring system, into the decision of when and how to activate the visual signals, it will be possible to produce less intrusive but more effective visual signals.

Figure 1:
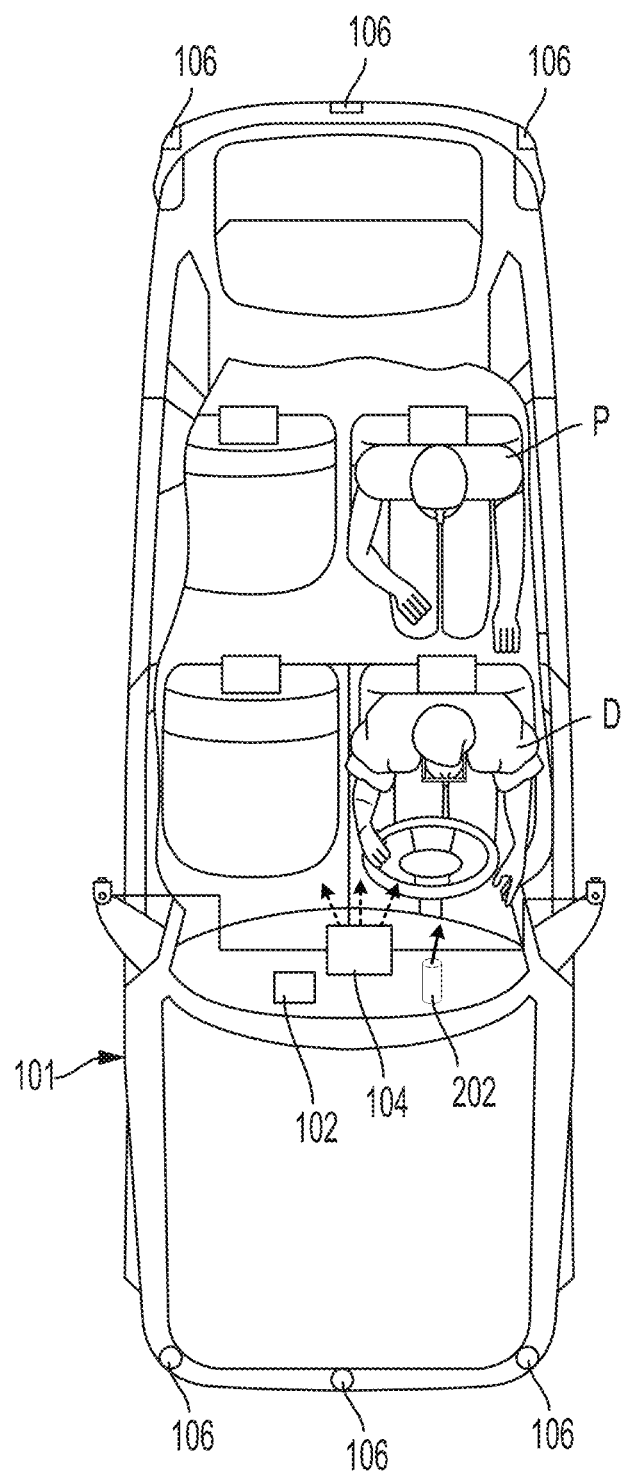
FIG. 1 is a diagram of a vehicle with an operator monitoring system according to one aspect of the present disclosure.

FIG. 1 depicts a top view of a vehicle 101 equipped with an occupant monitoring system 102 according to aspects described herein. The vehicle 101 may include one or more environmental sensors 106 to assist the vehicle 101 with its autonomous and semi-autonomous functions and sense changing environmental conditions. For simplicity, in FIG. 1, the environmental sensors 106 are defined in a rear section and a front section of the vehicle 101, however the environmental sensors 106 may be located elsewhere on the vehicle. The environmental sensors 106 may be used to detect the driving environment from a 360° perspective. The environmental sensors 106 may provide information related to the operation of the vehicle 101, including the occupant monitoring system 102 and an operator alert system 202. The environmental sensors 106 may include RADAR, LiDAR, SONAR, proximity, motion, audio or another type of sensor. Information received by the occupant monitoring system 102 from the sensor system may be used to determine the current driving environment of the vehicle as well as a future or approaching environment.

According to one aspect of the present disclosure, the occupant monitoring system 102 may include an occupant-facing camera 104 that is configured to obtain images, or a sequence of images, of one or more occupants of the vehicle, such as a driver D, or a passenger P. The camera 104 may include one or more image sensors configured to obtain image data from the cabin of the vehicle. The image sensors may include, for example, an RGB camera, a monocular camera, or infrared sensors to obtain high-resolution images of the occupants' eyes, face, hands, posture, pose, or the like. The occupant monitoring system 102 may interface with other components and systems of the vehicle 101, including operator alert system 202 to enhance and assist autonomous and semi-autonomous functions.

Figure 2A:
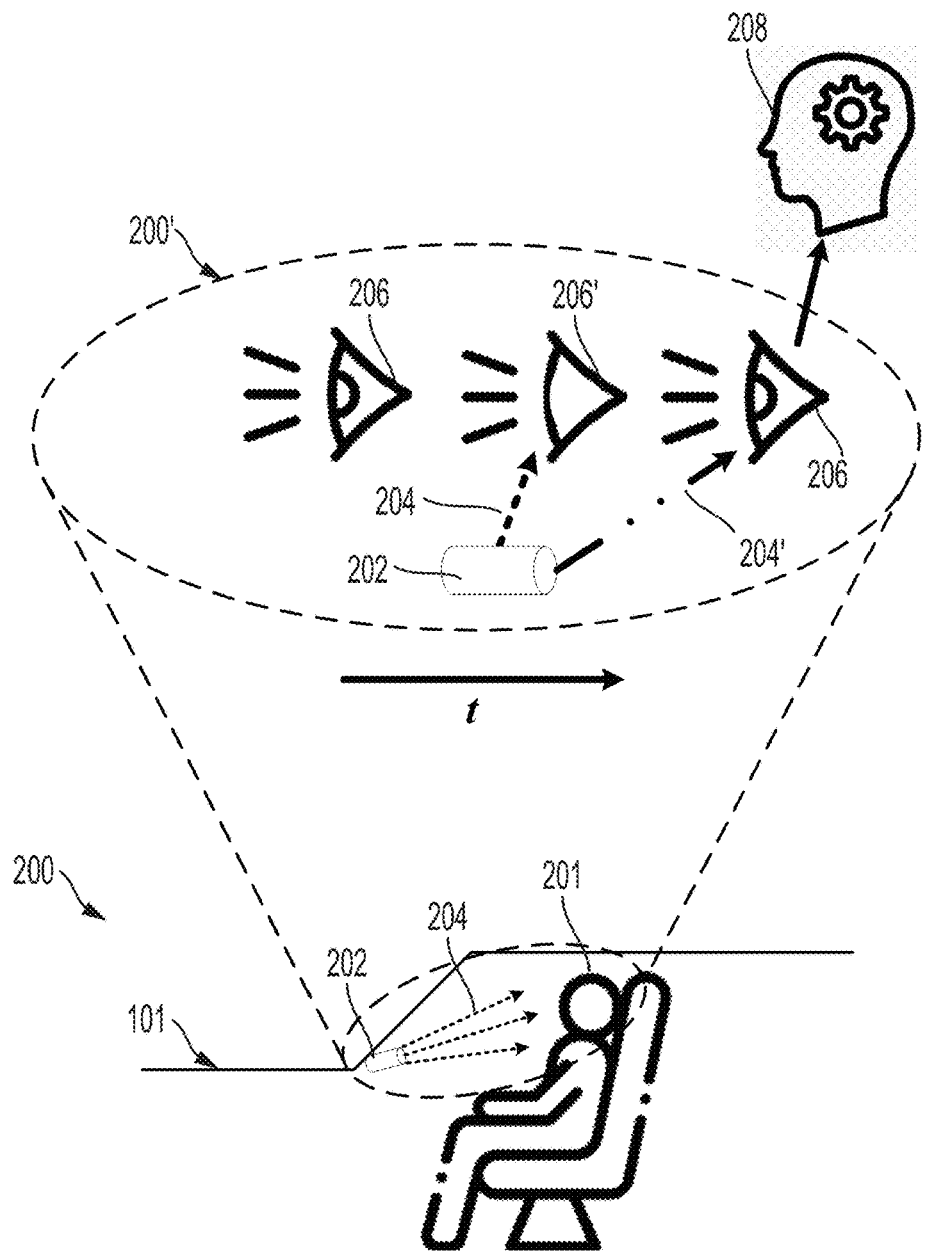
FIG. 2A is a conceptual diagram of an operator alert system according to one aspect of the present disclosure.

FIG. 2 is a conceptual diagram 200 of an operator alert system 202 according to one aspect of the present disclosure. The operator alert system 202, or components thereof, may be positioned in a vehicle 101 such that an operator 201 may readily see and take notice of visual signals 204 generated and transmitted by the operator alert system 202. The operator alert system 202 may, through visual signals, alert the operator of certain conditions or events regarding the operation of the vehicle 101. For example, the operator alert system may receive data from another on-board, or off-board system requiring the attention of the operator, such as a nearby vehicle or an obstacle detected in the vehicle's projected trajectory. Upon recognizing the visual signal 204, the operator may take corrective action, if necessary, to address the cause of the visual signal 204.

According to one aspect, of the present disclosure the effectiveness of a visual signal 204 could be improved by conditioning the visual signal 204 on the state of a driver, measured by the DMS. By combining estimates of driver state from a DMS, such as eye gaze direction, eye openness, estimated cognitive load, or estimated driver activity, the timing and the intensity of a visual signal may be manipulated to make it more salient and elicit a faster driver response time.

For example, and in reference to the enlarged portion 200' of FIG. 2, an average human eye blink might last t=100-150 ms. If an operator's eyes are in a closed state 206' at the point when the vehicle would ordinarily initiate a visual signal 204, it may serve the system to wait until some small period after the driver's eyes reopen to an open state 206 in order to initiate the visual signal 204. By initiating a visual signal 204 a fraction of a second after a driver's eyes reenter an open state 206, instantaneous visual variation may be created in the visual field of the driver, which can draw attention and create a response in the operator's mind 208 much more rapidly. Visual signals 204 transmitted reflecting changes to the vehicle operation or surrounding environment during blinks can sometimes be missed due to "change blindness" effects. This may result in reducing the efficacy of a visual signal 204 which is initiated during a blink, or closed state.

Similarly, according to one aspect, for warnings which require foveal attention (e.g., HUD-based warnings), it may be beneficial to alter the rate of flashing or appearance of the visual signal 204 dependent on the driver's gaze. For example, a visual signal 204 including a rapid flashing of a target (e.g., a dashboard light) may be salient in person's periphery, but may be annoying or otherwise disruptive if the person is already attentive to the target. Similarly, a bright signal may be more salient, but also distracting and/or disruptive if a driver is trying to see beyond the bright signal. On the other hand brighter, flashing signals may be more effective at drawing the attention of drivers whose attention is strongly engaged in other activities. In all these cases, the vehicle may use simple logic or more sophisticated artificial learning mechanisms in order to modulate the visual signal, including the timing of its onset, its brightness, frequency, or the like, conditioned on the driver's evolving behavior (e.g., gaze direction, eye openness, driver activity) during an event.

Figure 2B:
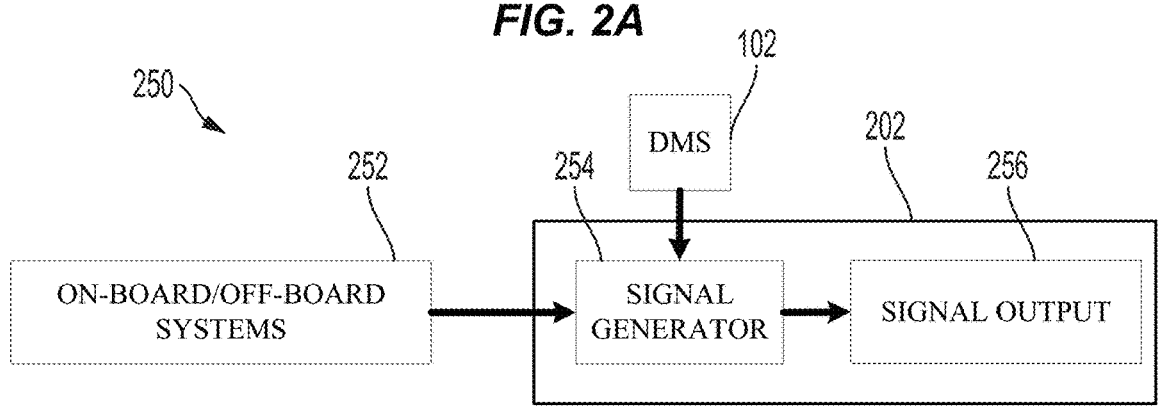
FIG. 2B is a flow diagram of a vehicle signal system according to one aspect of the present disclosure.

FIG. 2B is a flow diagram of a vehicle signal system 250 according to one aspect of the present disclosure. As described herein, an operator alert system 202 may receive data from certain on-board/off-board systems 252 that may necessitate a signal to be generated. Examples of on-board/off-board systems 252 may include, without limitation, LiDAR, RADAR, SONAR, radio, proximity sensor, audio sensor, GPS, Wi-Fi, cellular, environmental or trajectory systems, planning systems, advanced driving assistance systems (ADAS), or the like. The operator alert system 202 may include, without limitation a signal generator 254 and a signal output 256. The operator alert system 202 may be in communication with a DMS 102 and receive data from the DMS 102, such as an operator state. The signal generator 254 of the operator alert system 202 may generate a signal based on the data received from the on-board/off-board systems 252. The signal generator 254 may further condition the signal according to data received from the DMS 102. For example, the signal generator 254 may condition the signal to be delayed or timed to occur when the operator's eyes are in an open state, as reported, estimated, predicted, or otherwise determined from the DMS 102. The signal generator 254 may also condition, in the case of a visual signal, the brightness, blinking frequency, or other visual characteristic of the visual signal according to the DMS 102 data. According to one aspect, the operator alert system 202 may reduce driver response time to visual signals in the vehicle, and as a secondary result create a less intrusive alert experience, as the signals may be conditioned or fine-tuned to an individual operator's behaviors, instead of a one-signal-suits-all paradigm.

Figure 3:
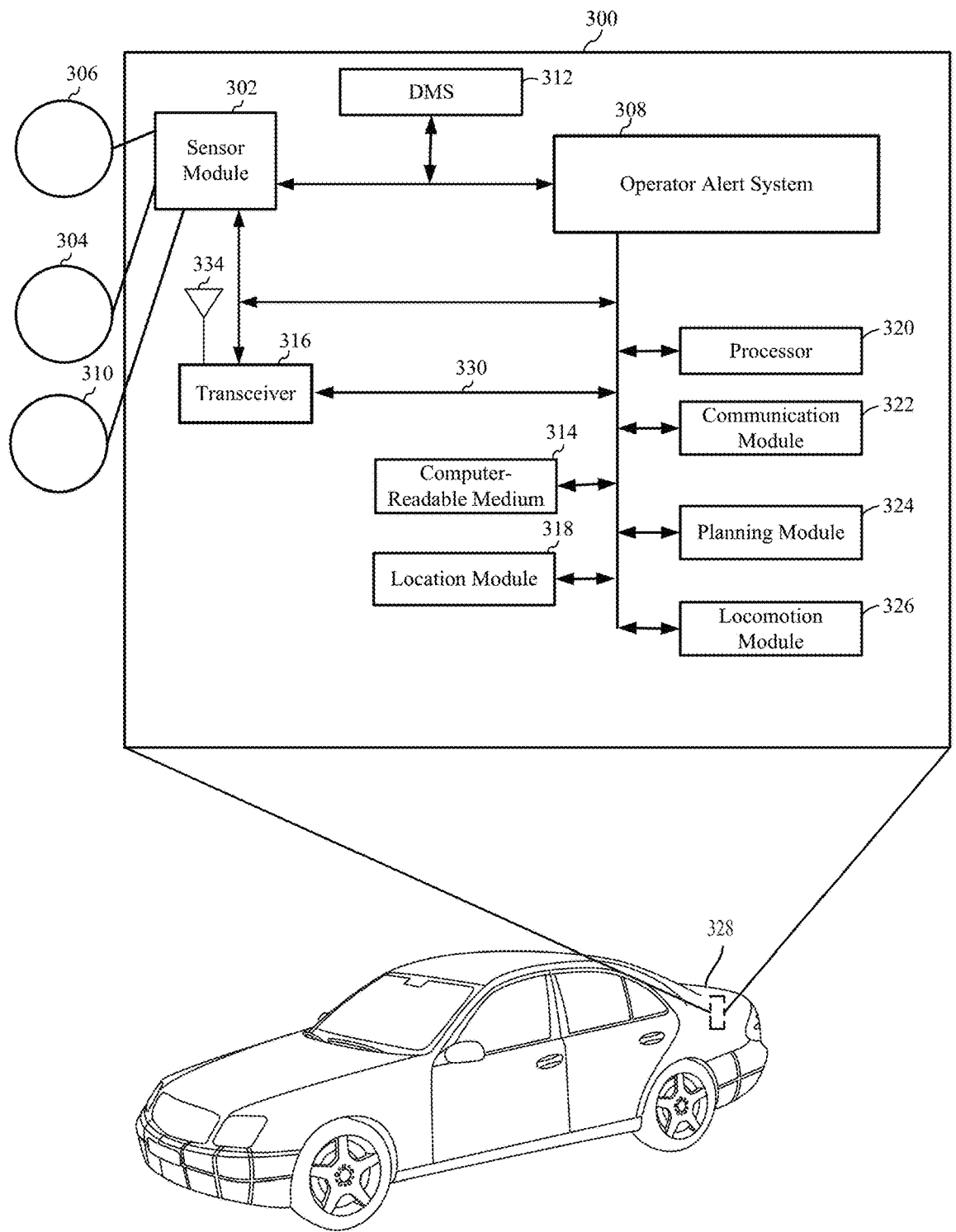
FIG. 3 is a hardware implementation of a vehicle signal system according to one aspect of the present disclosure.

FIG. 3 is a diagram illustrating an example of a hardware implementation for a vehicle signal system 300, according to aspects of the present disclosure. The vehicle signal system 300 may be part of a passenger vehicle, a carrier vehicle, or other device. For example, as shown in FIG. 3, the vehicle signal system 300 may be a component of an autonomous or semi-autonomous car 328. Aspects of the present disclosure are not limited to the vehicle signal system 300 being a component of the car 328, as other devices, including, but not limited to, autonomous, semi-autonomous, or other vehicles may also include and use the vehicle signal system 300.

The vehicle signal system 300 may be implemented with a bus architecture, represented generally by a bus 330. The bus 330 may include any number of interconnecting buses and bridges depending on the specific application of the vehicle signal system 300 and the overall design constraints. The bus 330 may link together various circuits including one or more processors and/or hardware modules, represented by a processor 320, a communication module 322, a location module 318, a sensor module 302, an actuation module 326, a planning module 324, and a computer-readable medium 314. The bus 330 may also link various other circuits such as timing sources, peripherals, voltage regulators, and power management circuits, which are well known in the art, and therefore, will not be described any further.

The vehicle signal system 300 may include a transceiver 316 coupled to the processor 320, the sensor module 302, a predictive lighting module 308, the communication module 322, the location module 318, the actuation module 326, the planning module 324, and the computer-readable medium 314. The transceiver 316 is coupled to an antenna 334. The transceiver 316 communicates with various other devices over a transmission medium. For example, the transceiver 316 may send and receive commands via transmissions to and from a server or a remote device, such as remote device or server (not shown).

The operator alert system 308 may include the processor 320 coupled to the computer-readable medium 314. The processor 320 may perform processing, including the execution of software stored on the computer-readable medium 314 providing functionality according to the disclosure. The software, when executed by the processor 320, causes the vehicle signal system 300 to perform the various functions described for a particular device, such as car 328, or any of the modules 302, 308, 314, 316, 318, 320, 322, 324, 326. The computer-readable medium 314 may also be used for storing data that is manipulated by the processor 320 when executing the software.

The sensor module 302 may be used to obtain measurements via different sensors, such as a first sensor 306, a second sensor 304, and a third sensor 310. The first sensor 306 may be a motion sensor, such as an accelerometer, gyroscope, inertial measurement unit, or the like. The second sensor may include a visual sensor, such as a stereoscopic camera, a red-green-blue (RGB) camera, LIDAR or RADAR. The third sensor 304 may be an in-cabin sensor, such as a camera, CCD, infrared sensor, or the like, configured to obtain images of an occupant of the car 328. Of course, aspects of the present disclosure are not limited to the aforementioned sensors as other types of sensors, such as, for example, thermal, sonar, and/or lasers are also contemplated for either of the sensors 304, 306, 310. The measurements of the sensors 304, 306, 310, may be processed by one or more of the processor 320, the sensor module 302, the DMS 312, the operator alert system 308, the communication module 322, the location module 318, the actuation module 326, the planning module 324, in conjunction with the computer-readable medium 314 to implement the functionality described herein. In one configuration, the data captured by the first sensor 306, the second sensor 304, and the third sensor 306 may be transmitted to an external device via the transceiver 316. The sensors 304, 306, 310 may be coupled to the car 328 or may be in communication with the car 328.

The location module 318 may be used to determine a location of the car 328. For example, the location module 318 may use a global positioning system (GPS) to determine the location of the car 328. For example, the vehicle signal system 300 may be able to communicate with a remote monitoring service, such as mapping/navigation service, a weather service, or other environmental information provider. Information obtained through the location module may assist in determining approaching changes in environmental conditions and ambient lighting conditions. The information received through and generated by the location module 318 may inform the operator alert system 308 of environmental conditions or other trajectory-based data.

The communication module 322 may be used to facilitate communications via the transceiver 316. For example, the communication module 322 may be configured to provide communication capabilities via different wireless protocols, such as Bluetooth, Wi-Fi, long term evolution (LTE), 3G, 5G, or the like. The communications module may also be configured to establish a communication channel between the car 328 and an information provider. The communication module 322 may also be used to communicate with other components of the car 328 that are not modules of the operator alert system 308.

The vehicle signal system 300 may also include the planning module 324 for planning a response to a driver state. The planning module may interface with or be a part of the operator alert system 308. The planning module 324 may include a set of instructions or settings that dictate how the vehicle signal system 300 may respond when triggered by a change. For example, depending on the signals from any of the sensors 304, 306, 310, and/or the DMS 312 detailing an operator state, the planning module may respond with information necessary for the operator alert system 308 to condition an alert according to such a state. The planning module 324, as well as other modules described herein, may be software modules running in the processor 320, resident/stored in the computer-readable medium 314, one or more hardware modules coupled to the processor 320, or some combination thereof.

The operator alert system 308 may be in communication with the sensor module 302, the DMS 312, the transceiver 316, the processor 320, the communication module 322, the location module 318, the actuation module 326, the planning module 324, and the computer-readable medium 314. In one configuration, the operator alert system 308 may receive sensor data from the sensor module 302 and/or DMS 312. The sensor module 302 and/or DMS 312 may receive the sensor data from the sensors 304, 306, 310. According to aspects of the disclosure, the sensor module 302 and/or DMS 312 may filter the data to remove noise, encode the data, decode the data, merge the data, or perform other functions. In an alternate configuration, the operator alert system 308 may receive sensor data directly from the sensors 304, 306, 310.

As shown in FIG. 3, the operator alert system 308 may include or be in communication with the DMS 312, planning module 324 and/or the location module 318. The operator alert system 308, based on the operator state information obtained from the sensor module 302 and/or DMS 312, and other information from the communication module, and others, may generate, condition, or otherwise adapt a signal to be transmitted to the operator. The operator alert system may condition an alert, such as a visual signal, according to data received in real-time concerning the current state of the operator. Such operator states may include, without limitation, blinking, rate of blinking, prolonged eye closure, indirect gaze, direct gaze, pose, or other operator conditions. Further, or alternatively, the operator alert system may condition signals to output to an operator based on historic data, personal data, or behavioral data created, modified or learned by artificial learning systems or networks. The operator alert system 308 may include or be in communication with local or remote memory that may store driver data, profiles or learned behavioral models.

Figure 4:
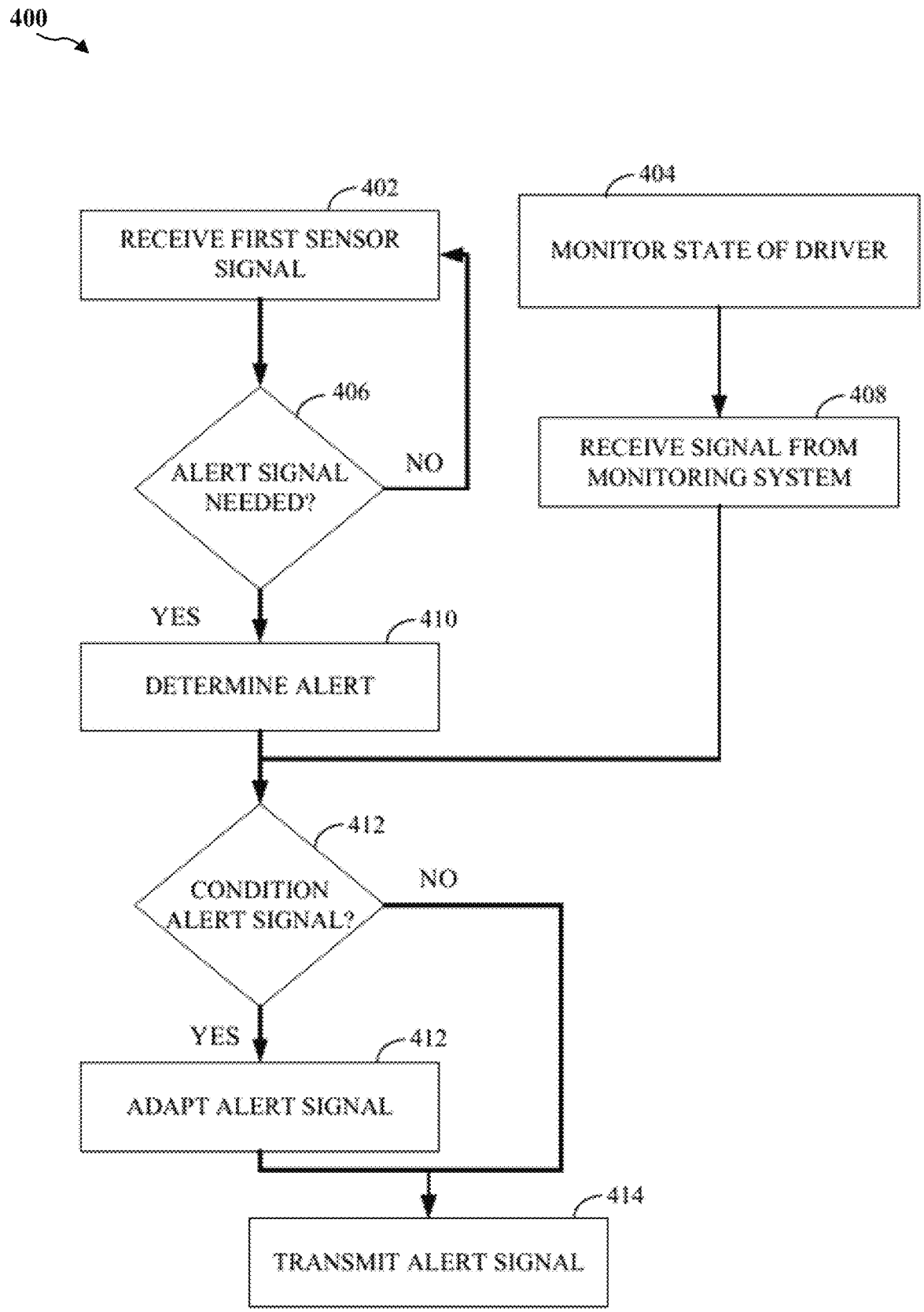
FIG. 4 is a flow diagram of a method of generating visual signals according to one aspect of the present disclosure.

FIG. 4 depicts a method 400 of monitoring a vehicle occupant according to an aspect of the present disclosure. As shown in block 402, an operator alert system may receive a first signal from an on-board/off-board system sensor, as described herein. The sensor signal may be indicative of an event occurrence, or an environmental or vehicle state measured or detected by the sensor. The operator alert system may, as shown in block 406, determine if an alert signal is needed. For example, if the signal received from the on-board/off-board system exceeds a threshold, or is detected outside of a boundary or range, the system may determine that the operator should be alerted to the measured event. As shown in block 410, the system may determine what the alert should be and/or how the alert should be output.

Concurrently, a driver monitoring system may be monitoring the state of the driver, as shown in block 404 and described herein. The operator alert system may receive a signal from the driver monitoring system reflective of a driver state. As described herein, the driver state may include, without limitation, eye blink, pose, gaze, hand position, or the like. The operator alert systm my periodically poll the driver monitoring system, or alternatively, the driver monitoring system may be adapted to issue a signal upon detection of a change in driver state, or other event.

As shown in block 412, the operator alert system upon determining an alert and receiving a signal from the driver monitoring system, may determine if the alert signal requires conditioning based on the state of the driver. If the operator alert system determines the signal does not need to be conditioned, the system may transmit or output the signal to the driver. If, however, the operator alert system determines that the alert signal should be conditioned based on the driver's state, the system may alter or condition the signal, shown in block 412, according to the information received from the driver monitoring system and described herein. The operator alert system may, as shown in block 414, transmit the conditioned alert signal to the driver, as described herein.

While aspects of the present disclosure describe a vehicle signal system focused on a driver or a car, one skilled on the art will appreciate that the system may be implemented to monitor any occupant or multiple occupants in any vehicle type. Further, while aspects of the present disclosure detail generating and conditioning visual signals to be transmitted to an operator, one skilled in the art will appreciate that the systems and methods described herein may include audio, visual, haptic, tactile or other signals conditioned by an operator's state.

Further, while aspects of the present disclosure detail an operator state including blinking or closed eye state, one skilled in the art will recognize that other operator states, including pose, gaze, posture, hand position, auditory state, ambient lighting, environmental conditions, or the like may be used to condition the signals generated and transmitted.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RANI from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A vehicle alert system comprising:
   an on-board/off-board vehicle state system coupled to at least one vehicle sensor;
   a driver monitoring system including an image sensor;
   a processor, configured to:
   generate a vehicle alert signal in response to a first signal from the on-board/off-board vehicle state system;

receive a driver state signal from the driver monitoring system;

condition a display of the vehicle alert signal based upon the driver state signal when the vehicle alert signal is a visual vehicle alert signal; and display the visual vehicle alert signal to the driver a fraction of a second after a driver's eyes reenter an open state in response to a blinking frequency of the driver according to the driver state signal, in which the blinking frequency of the driver corresponds to an average human eye blink.

2. The vehicle alert system of claim 1 wherein the driver state signal includes a closed eye state.

3. The vehicle alert system of claim 1 wherein the driver state signal includes an open eye state.

4. The vehicle alert system of claim 1 wherein the driver state signal includes a pose.

5. The vehicle alert system of claim 1 wherein the driver state signal includes a gaze.

6. The vehicle alert system of claim 1 wherein conditioning the first signal includes a delay.

7. The vehicle alert system of claim 1 wherein conditioning the first signal includes a brightness.

8. The vehicle alert system of claim 1 wherein conditioning the first signal includes an output frequency.

9. The vehicle alert system of claim 1 wherein conditioning the first signal includes a modeled behavior.

10. The vehicle alert system of claim 9 wherein the modeled behavior comprises a machine learning model.

11. A method of generating a vehicle alert, the method comprising:

generating a vehicle alert signal in response to a first signal from an on-board/off-board vehicle state system coupled to at least one sensor;

receiving a driver state signal from a driver monitoring system comprising an image sensor;

conditioning a display of the vehicle alert signal based upon the driver state signal when the vehicle alert signal is a visual vehicle alert signal; and displaying the visual vehicle alert signal to the driver a fraction of a second after a driver's eyes reenter an open state in response to a blinking frequency of the driver according to the driver state signal, in which the blinking frequency of the driver corresponds to an average human eye blink.

12. The vehicle alert system of claim 11 wherein the driver state signal includes a closed eye state.

13. The vehicle alert system of claim 11 wherein the driver state signal includes an open eye state.

14. The vehicle alert system of claim 11 wherein the driver state signal includes a pose.

15. The vehicle alert system of claim 11 wherein the driver state signal includes a gaze.

16. The vehicle alert system of claim 11 wherein conditioning the first signal includes a delay.

17. The vehicle alert system of claim 11 wherein conditioning the first signal includes a brightness.

18. A non-transitory computer-readable medium having program code recorded thereon for generating a vehicle alert, the program code executed by a processor and comprising:

program code to generate a vehicle alert signal in response to a first signal from an on-board/off-board vehicle state system coupled to at least one vehicle sensor;

program code to receive a driver state signal from a driver monitoring system comprising an image sensor;

program code to condition a display of the vehicle alert signal based upon the driver state signal when the vehicle alert signal is a visual vehicle alert signal; and program code to display the visual vehicle alert signal to the driver a fraction of a second after a driver's eyes reenter an open state in response to a blinking frequency of the driver according to the driver state signal, in which the blinking frequency of the driver corresponds with an average human eye blink.

* * * * *